XR 3,609,027

United States Patent

[11] 3,609,027

[72] Inventor Serge Lowenthal
Paris, France
[21] Appl. No. 820,058
[22] Filed Apr. 29, 1969
[45] Patented Sept. 28, 1971
[73] Assignee Thomson CSF
[32] Priority May 15, 1968
[33] France
[31] 151,801

[54] ARRANGEMENT FOR PRODUCING MULTIPLE IMAGES
8 Claims, 5 Drawing Figs.

[52] U.S. Cl. .......... 355/2, 95/1R, 350/3.5, 350/162 ZP, 355/46
[51] Int. Cl. .......... G03b 27/44
[50] Field of Search .......... 355/2, 46; 95/1; 350/3.5, 162 ZP

[56] References Cited
UNITED STATES PATENTS
3,405,614 10/1968 Lin et al. .......... 350/3.5 X

*Primary Examiner*—Samuel S. Matthews
*Assistant Examiner*—R. A. Wintercorn
*Attorney*—Cushman, Darby & Cushman

ABSTRACT: An arrangement for projecting by means of a quasi-monochromatic incoherent source of radiant energy, multiple images of a transparency illuminated by the above-mentioned source. The multiple images are projected through the medium of a holographic lens.

3609027
OR IN 355/2

ARRANGEMENT FOR PRODUCING MULTIPLE IMAGES

The present invention relates to the production of multiple images of a single object. Such devices can be used in particular for the production by photoengraving techniques of matrices of integrated circuits.

In order to manufacture circuits of this kind, it is necessary to produce from a single integrated circuit, a real image of a large number of identical elements arranged side by side.

With this object in mind, several methods have been developed using holograms. In particular, a hologram of a flat arrangement of luminous spots can be used as an optical space filter in an optical system which carries out a double Fourier transform.

However, all these systems operate with coherent light, and this involves a certain number of drawbacks. First of all, any dust located in the trajectory of the light beams, is "projected" onto the image which results in highly undesirably diffraction patterns, in particular where application to the production of printed circuits is concerned, namely an application which requires extremely sharp images. On the other hand, it is necessary to use a laser as the light source. This means that in practice it is not possible to project directly the image obtained, onto the photosensitive resin used in the manufacture of integrated circuits, since such resins are sensitive only to ultraviolet light.

In accordance with the invention, incoherent light source is used. This means that the aforesaid drawbacks can be overcome; in particular, by using an ultraviolet light source, images can be directly obtained on layers of photosensitive resin.

Moreover, the system of the invention presents the further advantage that, for the same aperture, the same optical system has a resolving power which is two times higher in the case of incoherent light than it is in the case of coherent light.

According to the invention there is provided an arrangement for producing a multiple image of an object comprising: a quasi-monochromatic incoherent light source for illuminating said object; an hologram of a bidimensional arrangement of luminous spots, placed in a plane substantially parallel to said hologram, the latter being located for receiving light from said illuminated object; and optical means associated with said hologram for providing a real multiple image of said object by illuminating said hologram by means of said object.

For a better understanding of the invention and to show how the same may be carried into effect, reference will be made to the drawings accompanying the ensuing description and in which:

FIG. 1 illustrates one embodiment of the arrangement according to the invention;

FIG. 2 schematically illustrates the production of the hologram used;

Figure 1:
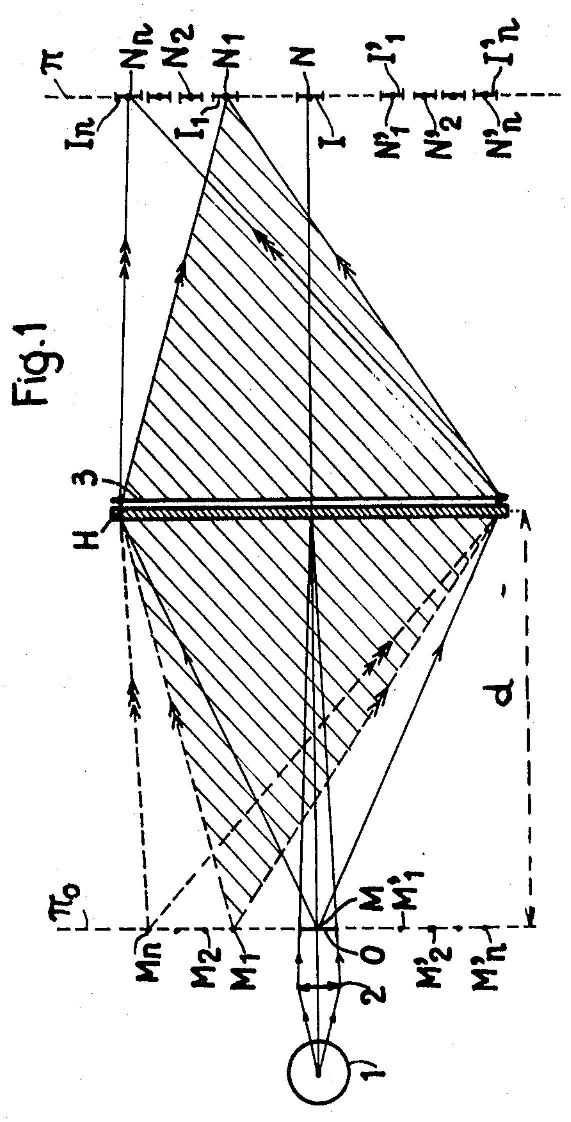

In FIG. 1, a multiplying hologram H of a flat arrangement of luminous spots is illuminated (in this case by transparency) by an object O, which is itself illuminated, through the medium of a condenser lens 2, by a quasi-monochromatic incoherent light source 1.

This source may, for example, be formed by a mercury vapor lamp followed by a band-pass filter which filters out part of the spectrum, such as the green line or a line in the ultraviolet range, depending upon the particular requirement.

The object 0 is for example, albeit not necessarily, located at such a distance $d$ from the hologram H that it is located in the plane $\pi_0$, in which the reference source was positioned during the formation of the hologram, and at the position at which said source was located.

An objective lens 3 enables a real multiple image to be produced in an image plane $\pi$, conjugate with the plane $\pi_o$ for the lens 3.

Figure 2:
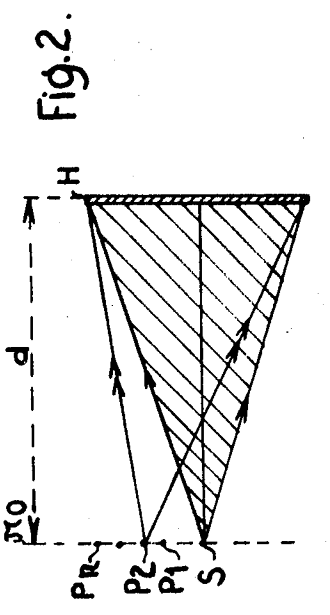
Figure 3:
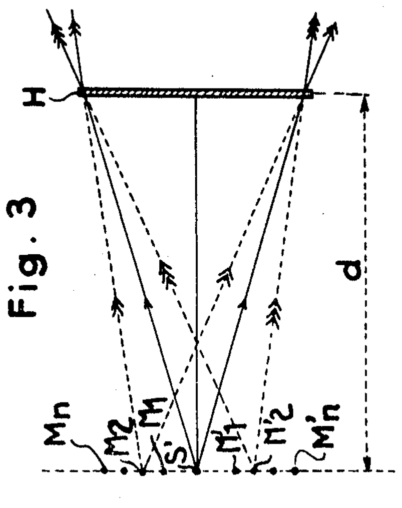
FIG. 3 is an explanatory diagram.

The operation of the device in accordance with the invention will be understood from a consideration of the diagrams 2 and 3:

The multiplying hologram H is obtained in the manner indicated in FIG. 2. In the plane $\pi_O$, located at the distance $d$ from the support H, there is located a two-dimensional arrangement of luminous spots $P_1, P_2, \ldots P_n$, and in the same plane a reference point source S. The reference beam and the illumination of the points $P_1, P_2, \ldots P_n$, are obtained from one and the same laser source. If then, as illustrated in FIG. 3, the hologram is illuminated by a point source S', located substantially at the same position, in the plane $\pi_O$, as the reference source S, the hologram H will restitute three waves, viz: a first wave which is directly transmitted and is of no interest here; a second wave, corresponding to a virtual image ($M_1, M_2, \ldots M_n$) without aberration, which image is referred to as the direct image and is identical to the recorded object and located at the same position, and a third wave, corresponding to a second virtual image ($M'_1$, $M'_2$, $M'_n$), the conjugate image, presenting aberration phenomena so that it is not used in the embodiment being considered. If this kind of reconstitution is to be produced using a point light source other than a laser, then a direct image with negligible chromatic aberration is obtained if the reconstituting source is quasi-monochromatic and if the distance $d$ is small (for example in the order of 10 cm.). The operation of the arrangement shown in FIG. 1 is then obvious. If the object O is assumed to have small dimensions compared to those of the hologram, then any point M on said object will appear as a reconstituting light source vis-a-vis the hologram H and, of this point M, the hologram will give a direct, virtual, multiple image $M_1, M_2, \ldots M_n$ and a conjugate virtual image of which the objective lens 3 will respectively produce real images $N_1, N_2, \ldots N_n$ and $N'_1, N'_2, \ldots N'_n$. Thus, starting from an object O, the hologram reconstitutes $n$ direct virtual images and $n$ conjugate images. These virtual images serve as virtual objects for the objective lens 3, and the latter produces, in the plane $\pi$, the respective real images thereof $I_1, I_2, \ldots I_n$ and $I'_1, I'_2, \ldots I_n$.

In this embodiment, only the direct multiple image, which has little aberration, is used. Also, preferably, the hologram H will be recorded with an arrangement of light spots centered around the axis and a reference source, which is offset in relation to said axis. When the multiple images are being produced, the object O is offset in the same way in relation to the axis of the hologram.

Self-evidently, the relative dispositions of the luminous spots $P_1, P_2, \ldots P_n$ and, in particular, their intervals, are selected as a function of the dimensions of the object O which is to be reproduced, and of the desired relative disposition of the images $I_1, I_2, \ldots I_n$, taking into account the magnification achieved by the objective lens 3, assumed to be unity in all the figures.

In the case where it is desired to produce a multiple image (made up of $n$ real images) of relatively large size, while retaining a high degree of resolution, and this is the case in particular in the manufacture of integrated circuits, it is necessary to use an objective lens which has both a high numerical aperture (this in order to achieve a high degree of resolution) and a substantial width of field. Conventional lenses, such as microscope lenses, do not simultaneously satisfy these two conditions. The variant embodiment of FIG. 4 makes it possible to use conventional objective lenses which produce a high degree of resolution, while obtaining a multiple image of substantial size.

Figure 4:
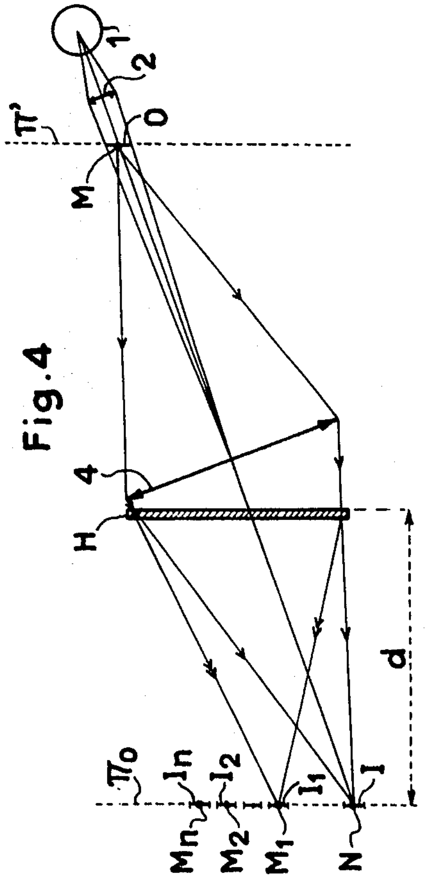
FIGS. 4 and 5 are further embodiments of an arrangement in accordance with the invention.

The hologram H is illuminated as shown in FIG. 4 at its rear face through an objective lens 4 which forms the image of the object O in the plane $\pi_o$ at the location at which the reference source was disposed at the time of the recording of the hologram. Then any point M on the object will give an image N in the plane $\pi_O$, which behaves as a virtual reconstituting source. The light wave converging towards the point N gives rise, after passage through the hologram H, to three waves one of which corresponds to a multiple, direct, real image with little aberration, $M_1, M_2, \ldots M_n$, the latter points being located at the precise position at which the points $P_1, P_2, \ldots P_n$ were located at the time of the recording, if the point N is located at the precise position at which the reference source S was originally located. Thus, with a conventional objective lens of high numerical aperture and small width of field, one can still obtain a large multiple image $I_1, I_2, \ldots I_n$.

Figure 5:
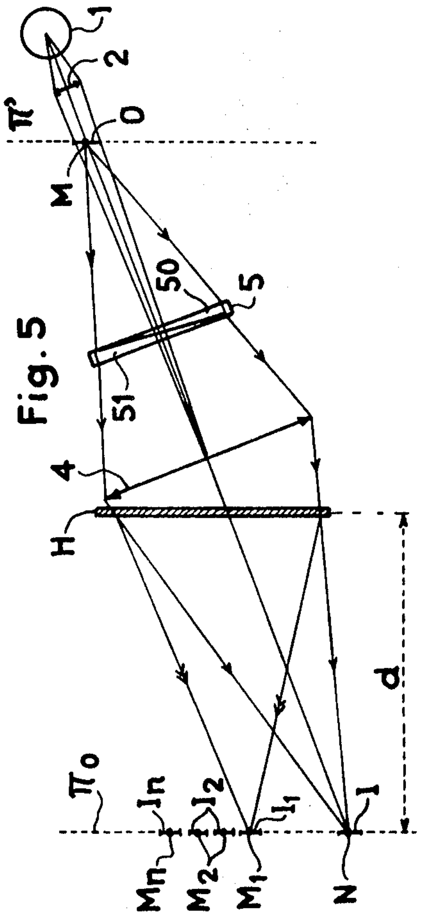

FIG. 5 illustrates a variant embodiment which enables the quality of the image obtained to be still further improved, should this be necessary. The arrangement in accordance with the invention still has a certain residual chromatic aberration because of the fact that the object O is illuminated by incoherent light, even though a quasi-monochromatic source is being used and the distance $d$ is small. The correction is effected quite simply by arranging in the trajectory of the light wave coming from O, a dispersive system 5 of some known kind which has the opposite chromatic aberration over the narrow bandwidth of the line source 1 which is used.

It is possible, for example, as illustrated in FIG. 5, to use two similar prisms 50 and 51 with a small apex angle which together form a plate with parallel faces, the two prisms having the same refractive index for the mean frequency of the band used, but opposite dispersive powers within said band.

It goes without saying that this corrective system can also be used in the embodiment of FIG. 1. It is easy to take account of the difference between the wavelength used at the time of recording the hologram by means of a laser and at the time of producing a multiple image using an incoherent source, in the ultraviolet spectrum for example, this either by using for the reproduction a distance $d$ which is no longer that used for the recording but has been suitably modified or by taking into account the variation in magnification produced, by giving the pattern O appropriate dimensions.

Of course, the examples described are in no way limitative of the scope of the invention. In particular, the object O may be illuminated by reflection and not by transmission. In addition, the network of points and the reference source need not necessarily be in the same plane $\pi_o$ at the time of recording the hologram.

What is claimed is:

1. An arrangement for producing a multiple image of an object comprising: a quasi-monochromatic incoherent light source for illuminating said object; a hologram of a bidimensional arrangement of luminous spots, placed in a plane substantially parallel to said hologram, the latter being located for receiving light from said illuminated object; and optical means associated with said hologram for providing a real multiple image of said object by illuminating said hologram by means of said object.

2. An arrangement as claimed in claim 1, wherein said optical means comprise an objective lens arranged for collecting the light beam from said object diffracted by said hologram.

3. An arrangement as claimed in claim 2, wherein said object is located at the place where the reference source was located with respect to said hologram for the formation thereof.

4. An arrangement as claimed in claim 2, wherein said optical means further comprise a dispersive system arranged in the path of said light beam, said dispersive system having a chromatic aberration opposite to the chromatic aberration of the combination of said objective lens and said hologram.

5. An arrangement as claimed in claim 1, wherein said optical means comprise an objective lens positioned between said object and said hologram for forming an image of said object at the other side of said hologram.

6. An arrangement as claimed in claim 5, wherein said objective lens is selected as to its focal distance and is disposed with respect to said hologram for said image to be formed at the place where the reference source was located with respect to said hologram for the formation thereof.

7. An arrangement as claimed in claim 5, wherein said optical means further comprise a dispersive system arranged between said object and said objective lens, said dispersive system having a chromatic aberration opposite to the chromatic aberration of the combination of said objective lens and said hologram.

8. An arrangement as claimed in claim 7, wherein said dispersive system comprises a plate with parallel faces constituted by two prisms with the same refractive index for the mean wavelength of said light source and with respective opposite dispersive powers.